US012762251B2

(12) United States Patent
Sankar

(10) Patent No.: US 12,762,251 B2
(45) Date of Patent: Oct. 13, 2026

(54) MULTI-AGENTIC HARDWARE CODE REVIEWER

(71) Applicant: MICROSOFT TECHNOLOGY LICENSING, LLC, Redmond, WA (US)

(72) Inventor: Padma Priya Sankar, Hillsboro, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/053,397

(22) Filed: Feb. 13, 2025

(65) Prior Publication Data

US 2026/0236586 A1 Aug. 13, 2026

(51) Int. Cl.

| | |
|---|---|
| ***G06F 21/57*** | (2013.01) |
| ***G06F 8/71*** | (2018.01) |
| ***G06F 11/3668*** | (2025.01) |

(52) U.S. Cl.

CPC .............. *G06F 21/577* (2013.01); *G06F 8/71* (2013.01); *G06F 11/3676* (2013.01)

(58) Field of Classification Search

CPC ..................................................... G06F 21/577

See application file for complete search history.

(56) References Cited

U.S. PATENT DOCUMENTS

| | | | | |
|---|---|---|---|---|
| 2023/0124113 | A1* | 4/2023 | Hudson | G06F 11/3438 726/22 |
| 2024/0427564 | A1* | 12/2024 | Petrov | G06F 8/33 |
| 2025/0111095 | A1* | 4/2025 | Lecroart | G06F 9/44505 |
| 2025/0138813 | A1* | 5/2025 | Likhitha | G06F 8/35 |
| 2025/0245132 | A1* | 7/2025 | Steinbok | G06F 8/71 |
| 2025/0272091 | A1* | 8/2025 | Baker | G06F 8/73 |
| 2025/0335185 | A1* | 10/2025 | Turner | G06F 8/73 |
| 2025/0370744 | A1* | 12/2025 | Ghatage | G06F 8/71 |
| 2025/0377876 | A1* | 12/2025 | Verma | G06F 8/60 |

* cited by examiner

*Primary Examiner* — Simon P Kanaan

(74) *Attorney, Agent, or Firm* — Han Gim; Newport IP, LLC

(57) ABSTRACT

A computing system receives computer-readable hardware code. A pull request is received that indicates the purpose of the hardware code or updates made to the hardware code. An artificial intelligence (AI) planner agent is invoked that is configured to interact with a plurality of AI review agents that are each trained to: parse the hardware code; analyze the hardware code with respect to the pull request and an attribute; and generate updates to the hardware code in accordance with criteria for meeting the attribute.

20 Claims, 13 Drawing Sheets

MULTI-AGENTIC HARDWARE CODE REVIEWER

BACKGROUND

Manual code reviews are time-consuming and prone to human error. Increased complexity in hardware development has led to the demand for more efficient and accurate hardware code reviews. In a fast-moving development environment that includes a significant amount of code and code changes, the inability to quickly provide effective code reviews can have consequences such as development delays and increased costs, which otherwise can lead to revenue loss and customer dissatisfaction.

It is with respect to these considerations and others that the disclosure made herein is presented.

SUMMARY

Code review is an important aspect of the hardware development process and can often identify issues that one would have missed by human review alone. The present disclosure describes an AI-based agentic code reviewer tool that initiates an interactive process to review, optimize, and provide meaningful comments for hardware code. In an embodiment, the AI-based agentic code reviewer tool includes multiple AI-based assistants, each configured to analyze the hardware code from unique aspects such as power, timing, semantics, and synthesis friendly attributes, to enable faster and more accurate reviews. The disclosed embodiments allow developers to efficiently maintain quality and consistency during hardware development.

The AI-based agentic code reviewer tool can provide substantial assistance in scanning code and understanding a pull request (PR) description for a proposed code change and providing suggestions and recommendations beyond what typical linting tools offer. The disclosed embodiments provide improvements over conventional techniques by enabling improved review of hardware code during development.

This Summary is not intended to limit the scope of the claimed subject matter. Furthermore, the claimed subject matter is not limited to implementations that solve any or all disadvantages noted in any part of this disclosure.

DESCRIPTION OF DRAWINGS

The Detailed Description is described with reference to the accompanying FIGS.

DETAILED DESCRIPTION

Figure 1A:
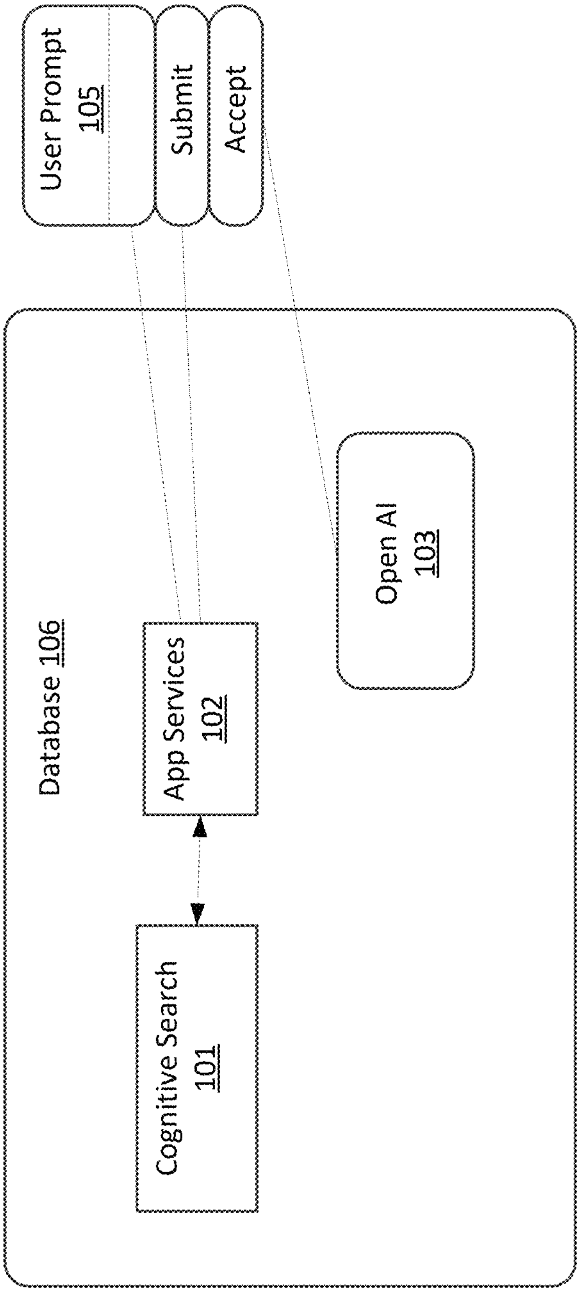
FIGS. 1A through 1D are diagrams illustrating the disclosed techniques according to one embodiment disclosed herein.

The present disclosure describes methods and systems for improving the efficiency of system and product development by automating the review of hardware code. As used herein, hardware code can refer to lower-level programming languages that interact with computing hardware such as machine code that operates on a specific processor architecture and code written in hardware description languages (HDLs) such as Verilog or Very High-Speed Integrated Circuit Hardware Description Language (VHDL) that simulate gates and transistors, or other such code. The hardware code can be computer-readable code, that, when compiled, generates computer executable instructions. When the computer executable instructions are executed by a computing system, corresponding operations are performed by the computing system. The hardware code is represented as a structured computer-readable object (e.g., text) conforming to a programming language as noted above.

In a typical development process, a developer determines the scope of changes to code (e.g., bug fix, feature enhancement, optimization, parametrization, refactoring, etc.) that need to be implemented. The changes are made in a local branch of the code and the change is verified using a design exercise, for example. A pull record (PR) is created and the changes are submitted and required reviewers are added. The pipeline runs the build and ensures that the build passes clock domain crossing (CDC), reset domain crossing (RDC), linting, etc. The required reviewers review the code based on the PR intent and provide feedback. Based on the feedback, the developer can initiate a dialogue, understand what the requested change is, and analyze the feasibility of implementing the changes. The developer can further include the change and push the change to the current PR, defer the change to a later PR, provide reasoning why the changes were not implemented, and/or complete the PR once the pipeline passes and approval is received from the required reviewers.

In an embodiment, the above-described process is modified by adding a process to initiate a code review by the disclosed AI-based agentic code reviewer tool to analyze the code and provide feedback. This can be done, for example, when creating the PR.

In an embodiment, the AI-based agentic code reviewer tool receives or accesses the PR description and analyzes the intent behind the changes (e.g., bug fix, feature enhancement, optimization, parametrization, refactoring). Based on the analysis, the AI-based agentic code reviewer tool determines if the changes align with the stated goals and suggests improvements or alternatives if an alternative approach is available based on the PR description. In an example, if the PR description states "Optimizing the retry logic in the Retrytracker module for lower latency," the AI-based agentic code reviewer tool can review the code and suggest specific changes that could further reduce latency. More generally, the AI-based agentic code reviewer tool can leverage semantic code understanding. For example, the AI-based agentic code reviewer tool identifies overly complicated logic and suggests simpler implementations, and identifies redundant code that can be written in a more compact manner.

In an embodiment, the AI-based agentic code reviewer tool provides contextual suggestions based on previous PRs. For example, the AI-based agentic code reviewer tool can analyze the history of previous pull requests and suggest patterns or improvements based on past bug fixes or common issues that have surfaced in similar code changes. In an embodiment, the AI-based agentic code reviewer tool provides consistency checks across the codebase (e.g., consistent naming conventions, coding styles, or practices).

In an embodiment, the AI-based agentic code reviewer tool includes a collaborative review mode in which the planner agent collaborates with the assigned reviewers and engages in interactive discussions on specific code reviews and provides suggestions and recommendations based on the discussions. If a human reviewer has added a review comment, the AI-based agentic code reviewer tool can reply to the review comment and engage in discussion with that reviewer.

In an embodiment, the AI-based agentic code reviewer tool can comprise a single agent code reviewer, where a single agent reviews the code and provides feedback. In some embodiments, the AI-based agentic code reviewer tool can include a multi-agent code reviewer. In one embodiment, each agent of the multi-agent code reviewer is configured to perform a specific task or type of code review. A planner agent is implemented that is configured to create a plan, send assignments to the individual review agents, and interact with the user. Once the review is completed, the planner agent interacts with the user and provides further clarifications. In some embodiments, the review agents are implemented in conjunction with a programming framework for AI agents and facilitating interaction among multiple agents to implement functions.

In one embodiment, a code refactor agent is implemented that is configured to identify complicated logic and suggest simpler implementations, and to identify redundant code.

In one embodiment, a power optimization agent is implemented that is configured to suggest code improvement for power optimization.

In one embodiment, a timing optimization agent is implemented that is configured to suggest code improvements for timing improvements.

In one embodiment, a comment agent is implemented that is configured to add comments, for example for changed code.

In one embodiment, a PR summarizer agent is implemented that is configured to summarize code changes.

In one embodiment, a CDC/RDC agent is implemented that is configured to ensure that there are no clock domain crossing and reset domain crossing violations introduced due to the code changes.

In one embodiment, a test bench agent is implemented that is configured to analyze if there are any additional test cases/coverage conditions that could be added for the new code changes.

In one embodiment, a security vulnerability detection agent is implemented that is configured to scan for vulnerabilities such as insecure reset, data races, or improper access control in hardware design.

The agents can be based on LLMs, but it should be understood that other models can be used that can be trained to perform code review. The agents can each be configured to perform a function with respect to code review and in accordance with an attribute, which can include an objective for the agent and criteria for achieving the objective. The agents can be trained using a knowledge base of previously implemented code releases and changes along with associated pull requests, as well as feedback, commentary, and documentation associated with the code and pull requests. The documentation can include various human and computer readable documents that can be used by an operator to investigate and resolve issues related to code changes. Documentation can also include procedures for identifying, analyzing, and resolving issues related to code changes. Documentation can further include test procedures and test results, and changes made in response to the test results. Such training data is typically not available in the public domain but readily available for an entity that writes and updates code and can be highly effective for training agents for performing code review.

The disclosed embodiments enable an intuitive and conversational AI process that enhances code review. In various embodiments, developers are able to engage in a dialogue-based code review process, simulating a conversation with an AI assistant. Developers can ask questions, provide clarifications, and receive real-time insights tailored to the specific context of their pull request. The assistant adapts its suggestions and recommendations based on user feedback during conversations, making the interaction more personalized and effective.

The disclosed embodiments provide an additional review perspective that can help detect potential issues at an earlier stage. The use of AI allows for retention of institutional knowledge, application of best practices, and lessons learned from previous reviews in a consistent manner. Additionally, the use of AI review allows reviewers to focus on more nuanced or complex issues. The use of AI review enables a clear description in PR submission as the code reviewer can summarize the code changes. The AI-based agentic code reviewer tool adapts its suggestions and recommendations based on user feedback during conversations, making the interaction more personalized and effective.

In an example, when the user submits an input (e.g., a diff list) for the code review, the AI-based agentic code reviewer tool causes a search of a database that comprises a knowledge base of previous code reviews. Learning from previous code reviews can be used to provide a concise and refined output. Once the user accepts the generated prompt, the response is stored in a database, where the prompt and response become part of the knowledge base for improving future responses. This process enhances the model's response by providing high-quality output examples for a language model (e.g., LLM) to emulate.

FIG. 1A illustrates an example code reviewer system using Retrieval Augmented Generation (RAG) methodology to build upon a knowledge base, integrating retrieval of information pertaining to previous code changes, and generated information. The knowledge base can include a database 106 that can be searched 101 based on semantic similarity or keyword matching with the proposed code changes, for example, provided by the user prompt 105 and facilitated by app services 102. The searched information can be used to provide additional context to the language model. The LLM 103 can synthesize a response using both the searched data and a generative response.

Figure 1B:
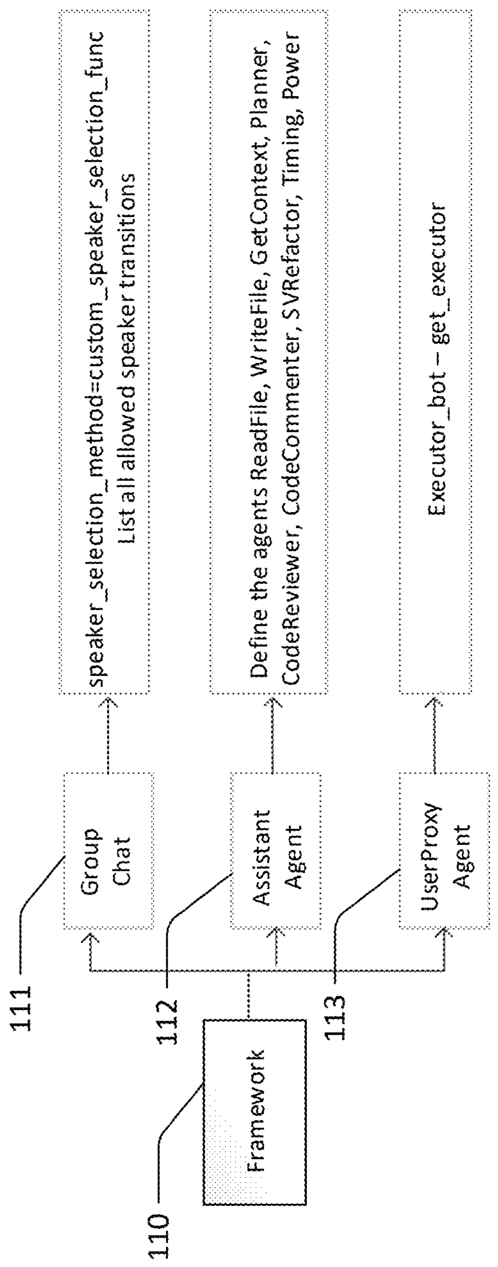

FIG. 1B illustrates an example of a framework 110 for defining code reviewer agents. The system and framework include individual agents 112, 113 dedicated to specific tasks such as code refactoring, PR summarizer, code commenter, timing and power optimization, thus ensuring comprehensive code review from multiple perspectives, as further described herein. The framework 110 can also include a group chat function 111 configured to control and monitor speakers/agents and allowed transitions.

Figure 1C:
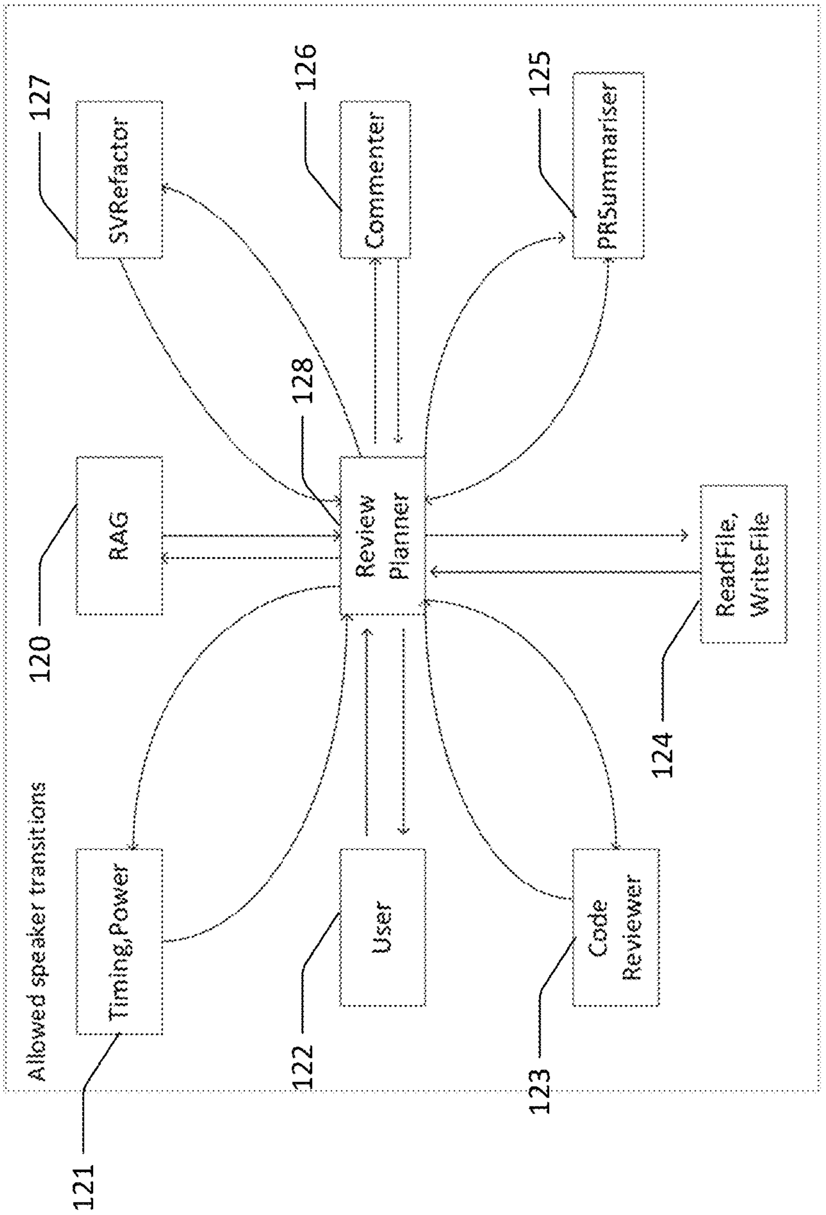

FIG. 1C illustrates example transitions between the code reviewer agents. The review planner agent 128 interacts with the user other code review agents. In this embodiment, in response to a query from the user 122, based on an input provided by the agents, the review planner agent 128 interacts with the specific agent to clarify the query. In one example, the agents can include a timing and power agent 121, SVrefactor agent 127, commenter agent 126, PRsummarizer agent 125, and code reviewer agent 123 as described further herein. Also illustrated are RAG component 120 that may include aspects illustrated in FIG. 1A, and readfile/writefile component 124 configured to read and write data during the code review process.

The table below describes example agents and associated prompts that can be used to review the code changes, in some embodiments. The example agents are scalable and can include additional agents to review other technical aspects as needed.

| Assistant Agents | Agent Description (prompt) |
|---|---|
| Review Planner | You decompose problems into smaller sub-tasks and assign them to appropriate assistants. You do not solve problems.<br>Suggest a plan that involves all the following assistants. These assistants are listed in no order:<br>(1) a SVRefactor who can review the code for modularity, abstraction, code bloat and redundancy and provide specific code suggestions.<br>(2) a SVCommenter who can review the code and add comments.<br>(3) CodeReviewer who can understand the system verilog code changes and perform semantic code analysis and provide specific code suggestions.<br>(4) a PRsummarizer to summarize the contents of the file provided by the user.<br>(5) a ReadFile that helps read the file.<br>(6) a Writefile that helps write the file.<br>(7) an executor who can execute python code.<br>(8) A User who accepts the comments or asks for further clarification.<br>(9) a TimingAnalyzer who can review the code and provide specific suggestions in the code for better timing closure.<br>(10) a PowerAnalyzer who can review the code and provide specific suggestions in the code for power savings.<br>There are 6 review steps - PRSummarizer, CodeReviewer, SVRefactor, SVCommenter, TimingAnalyzer, PowerAnalyzer. Pass the original read file output to all review assistants for them to review. If the user needs any clarification, assign the task to the corresponding assistant that gave the review, otherwise end the interview. |
| Code_Reviewer | You are a silicon logic design engineer.<br>Your job is to do a sematic code review, to create suggestions for how the provided verilog code could be improved, remove any redundancies, follow naming convention and look for spaces/tab misalignment.<br>Your suggestions should be specific and show the current code and your code suggestion.<br>Here are some of the key areas you should focus on while reviewing the code:<br>1. Coding Style: Consistent indentation and clear organization of code. Avoid deeply nested conditional blocks and long combinational processes.<br>2. Clocking and reset strategy: Ensure all sequential logic is correctly synchronized. Verify clock gating techniques are used properly to avoid glitches.<br>3. Synthesis Friendliness: The code should be synthesizable and map efficiently to hardware. Use of proper resource sharing where necessary to optimize logic<br>4. Concurrency and Parallelism: Ensure the design handles concurrency correctly, with no race conditions.<br>5. Ensure that constants and magic numbers are replaced with parameters, making the module adaptable.<br>6. Suggest if any assertions can be written corresponding to the changes code.<br>7. The design should be easily testable and support debug activities<br>Do not provide general code suggestions, provide your recommended modified code below the existing code. |
| SVCommenter | You are a system verilog programming expert.<br>You are not allowed to modify any of the code in the file.<br>Your job is to add or update comments to describe the function or structure of any module, interface, task, function, instantiation or generate block of code that you find in the file.<br>Before you add any comments, you must read the code to understand its functionality.<br>If no comment exists, you must add a comment to describe the code and its functionality.<br>The code may have been modified since the comment was added. You must read all comments and the subsequent code to ensure that the comments are accurate.<br>If a comment already exists and it accurately describes the code and its functionality, you must not add a new comment or modify the existing comment.<br>If a comment already exists but it is inaccurate, you must update the comment to accurately describe the code and its functionality.<br>You may add or update comments in any part of the file, but you must not modify any functional code. |
| System Verilog Code Refactor | You are a system verilog programming expert. Your job is to read change, refactor system verilog code to improve the code quality according to good hardware engineering principles and then take a record of the improvements. |

-continued

| Assistant Agents | Agent Description (prompt) |
|---|---|
| | You should look for opportunities to refactor the code to improve the code base according to good hardware engineering principles.<br>Some of these principles are:<br>1. Modularity - Breaking down the code into smaller, independent, and reusable components or modules<br>2. Abstraction - Hiding the implementation details of a module or component and exposing only the necessary information<br>3. Encapsulation - Wrapping the data and functions of a module or component into a single unit, and providing controlled access to that unit<br>4. SOLID - A set of principles that guide the design of software to make it more maintainable, reusable, and extensible. This includes the Single Responsibility Principle, Open/Closed Principle, Liskov Substitution Principle, Interface Segregation Principle, and Dependency Inversion Principle.<br>5. Scalability and Future Proofing: Design for scalability, making it easier to extend or improve the design later. Example: Use generate statements in Verilog to replicate structures or make certain design elements parameterized.<br>6. Maintainability & Readability: Use meaningful signal and module names<br>7. Avoiding Overdesign and Complexity - Keep the design as simple as possible without compromising the functionality. |
| Timing Analyzer | You are a system verilog programming expert. You should read system verilog code from the file and look for opportunities to improve the timing in the code base according to good hardware and silicon engineering principles.<br>Achieving timing closure in System Verilog design involves several key principles and techniques to ensure that your design meets the required timing constraints. Here are some fundamental principles:<br>1. Define Timing Constraints - Set up timing constraints such as clock period, setup and hold times, and maximum path delays. This helps guide synthesis and optimization tools to meet your design's timing requirements.<br>2. Pipelining - Break down long combinational paths by adding pipeline stages. This reduces the critical path delay and helps in meeting the timing requirements. For example, a computation-intensive module can be split into multiple stages to improve timing.<br>3. Retiming - Adjust the placement of registers within the design to balance the logic between them. This can help in reducing the critical path and improving overall timing.<br>4. Logic Restructuring - Modify the combinational logic to create shallower logic levels. This can involve techniques like logic duplication or restructuring to minimize the delay through the combinational paths.<br>5. Clock Gating - Use clock gating to reduce the dynamic power consumption and improve timing by minimizing the load on the clock network.<br>6. Static Timing Analysis (STA) - Perform STA to identify and analyze timing violations. This helps in pinpointing the critical paths that need optimization.<br>7. Physical Design Considerations - During the physical implementation, consider factors like placement and routing to ensure that the design meets the timing constraints. Proper floorplanning and routing can significantly impact the timing closure.<br>8. Iterative Optimization - Timing closure is often an iterative process. Continuously analyze the timing, apply optimizations, and re-evaluate until the design meets the required timing specifications. |
| Power Analyzer | You are a system verilog programming expert. You should read system verilog code from the file and look for opportunities to improve the potential power consumption in the code base according to good hardware and silicon engineering principles.<br>Improving power efficiency in System Verilog design involves several key principles and techniques. Here are some effective strategies:<br>1. Clock Gating - Disable the clock signal to idle or unused circuit blocks to significantly reduce dynamic power consumption. This can be implemented by using enable signals to control the clock distribution.<br>2. Power Gating - Shut off the power supply to inactive blocks of the circuit. This helps in reducing both dynamic and static power consumption.<br>3. Voltage Scaling - Adjust the operating voltage of the system or components based on workload requirements. Lowering |

-continued

| Assistant Agents | Agent Description (prompt) |
|---|---|
| | the voltage reduces power consumption.<br>4. Multi-Voltage Design - Use different voltage levels for different parts of the design. Critical paths can operate at higher voltages for performance, while non-critical paths can use lower voltages to save power.<br>5. Dynamic Voltage and Frequency Scaling (DVFS) - Dynamically adjust the supply voltage and clock frequency based on the processing requirements. This helps in balancing performance and power consumption.<br>6. Power Domains and Power Modes - Divide the design into multiple power domains and define valid power modes. This allows for fine-grained control over power consumption.<br>7. Low-Power Libraries - Use low-power cell libraries during synthesis and optimization to ensure that the design is optimized for power efficiency.<br>8. Data Path Optimization - Minimize the width of data paths and use efficient data encoding to reduce switching activities. Techniques like operand isolation and operand sharing can be beneficial.<br>9. Memory Power Reduction - Implement power-efficient memory structures and techniques such as data compression or caching to reduce memory access power.<br>10. Optimized State Machines - Design state machines with minimized state transitions and use one-hot encoding where possible to reduce power.<br>11. Reduce Capacitance - Minimize the use of large fan-out nets and reduce capacitance on critical paths to lower power consumption. |
| PR Summarizer | You are a system verilog programming expert. Your job is to read a change, analyze system verilog code to summarize the changes in a few lines. You should read system verilog code from the file and look at the changes done to create a good summary according to good hardware and silicon engineering principles. |

Figure 1D:
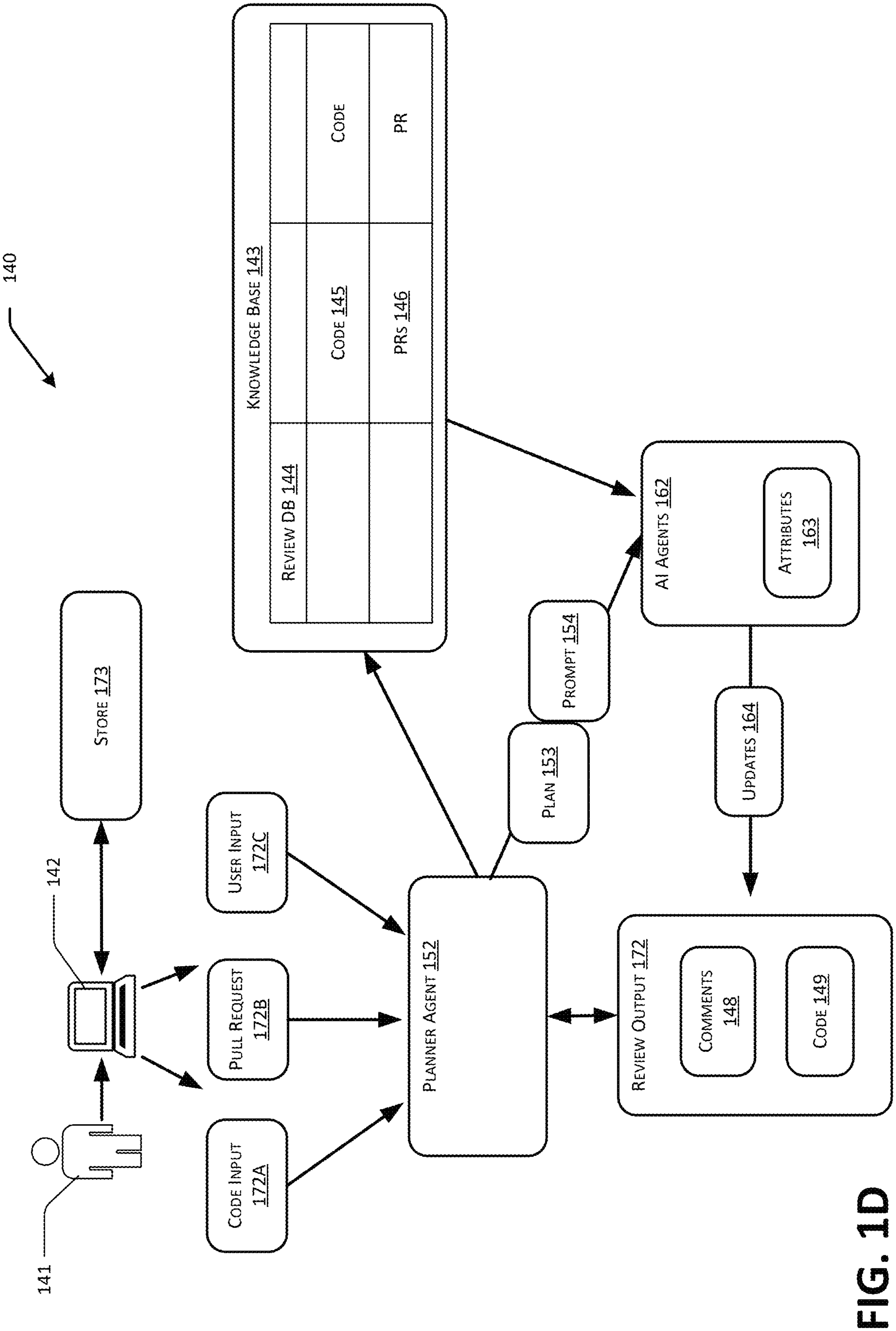

With reference to FIG. 1D, a code review framework 140 is configured to review code. The code review framework 140 is configured to receive code input 172A, pull request 172B, and other use input 172C. A store 173 of code and inputs is optionally available. A user or operator 141 can enter information via computer 142. A planner agent 152 is configured to parse the code and can also search the knowledge base 143.

The document/plan execution framework 140 is configured to interact with AI agents 162. The AI agents 162 are prompted to review code input 172A and generate review output 172 which can include comments 148 and suggested/recommended code 149.

In an embodiment, document/plan execution framework 140 includes knowledge base 143 based on previous code 145, PRs 146, and other information. The knowledge base 143 can include a review database 144 which can include one or more tables or other data structures.

In one embodiment, FIG. 1D illustrates analyzing computer-readable hardware code. Code input 172A can include computer-readable hardware code, that, when compiled, generates computer executable instructions. The computer-readable hardware code conforms to a programming language. When the computer executable instructions are executed by a computing system, operations are performed that analyze the computer-readable hardware code. Pull request 172B is received and indicates a purpose of the hardware code 172A or updates made to the hardware code 172A. AI planner agent 152 is invoked that is configured to interact with a plurality of AI review agents 162 that are each trained to parse the hardware code 172A; analyze the hardware code 172A with respect to the pull request 172B and an attribute 163; and generate updates 164 to the hardware code in accordance with criteria for meeting the attribute 163. A plan 153 for analyzing the hardware code 172A is dynamically generated. Based on the plan 153, prompts 154 are accessed for input to the AI review agents 162. The prompts 154 are usable to cause the AI review agents 162 to analyze content of the hardware code 172A and generate the updates 164 to the hardware code 172A in accordance with the criteria for meeting the attribute 163. The prompts 154 are input to the AI review agents 162. The AI planner agent 152 receives the generated updates 164 from the AI review agents 162. The updates 164 are rendered on an interface on computer 142 for presentation to user 141. Inputs 172C are received via the interface from the user 141. Based on the inputs 172C from the user 141, the AI planner agent 152 generates and inputs additional prompts 154 to the AI review agents 162.

In some embodiments, the review planner agent 152 can include a plan extractor component and a plan executor. In one embodiment, the review planner agent 152 analyzes a file or document such as a pull request and generates an executable plan. In an embodiment, this process is triggered when a pull request is created or modified. The process can also be triggered based on an operator or system input or command. The input can also include a set of agents that are available to execute the plan. The review planner agent 152 then causes execution of the plan. In an embodiment, plans can be iteratively generated. The review planner agent 152 provides a high-level plan, and subsequently adds details of each step in the plan.

To improve the quality of the plan, the review planner agent 152 can be executed in iterations that include interactions with a user. Within each iteration, the review planner agent 152 uses multi-step plan generation. After each round, the user can update the pull request based on the generated plan and feedback. In some embodiments, the plan can be represented as a flowchart or as a directed graph. The plan can comprise actions, conditions, and events.

Figure 2A:
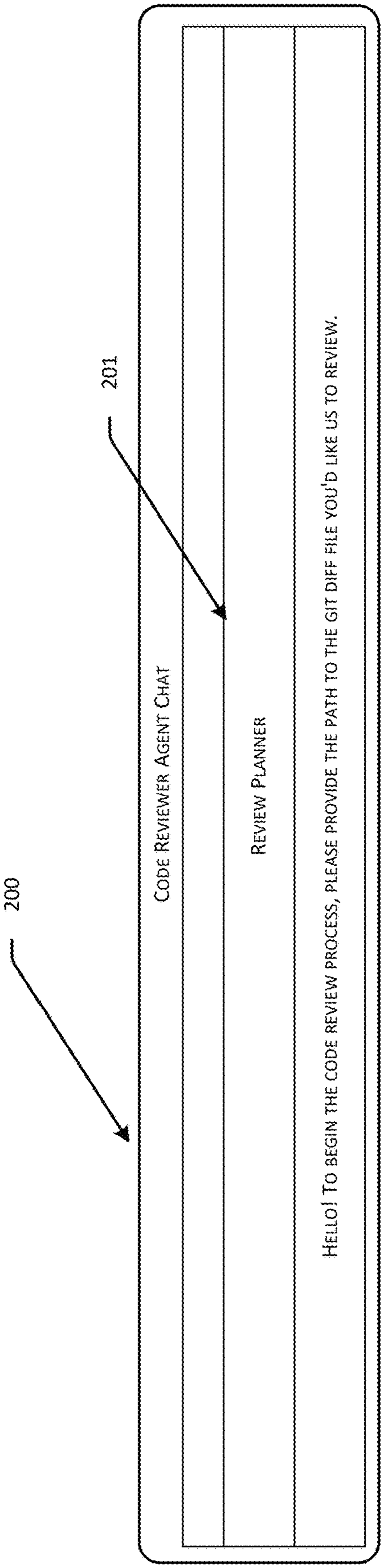
FIGS. 2A through 2D illustrate example interfaces according to one embodiment disclosed herein.
Figure 2B:
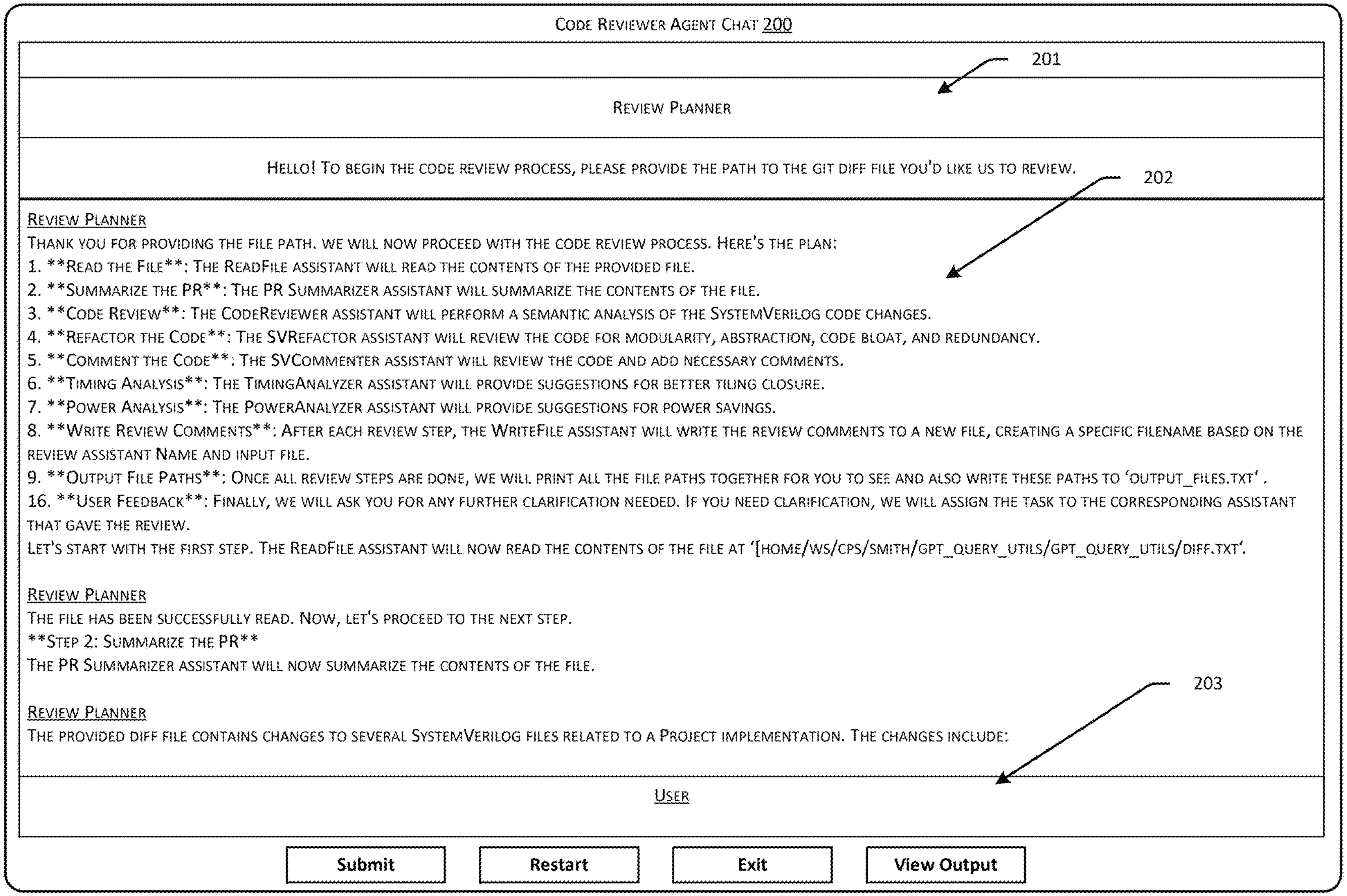
Figure 2C:
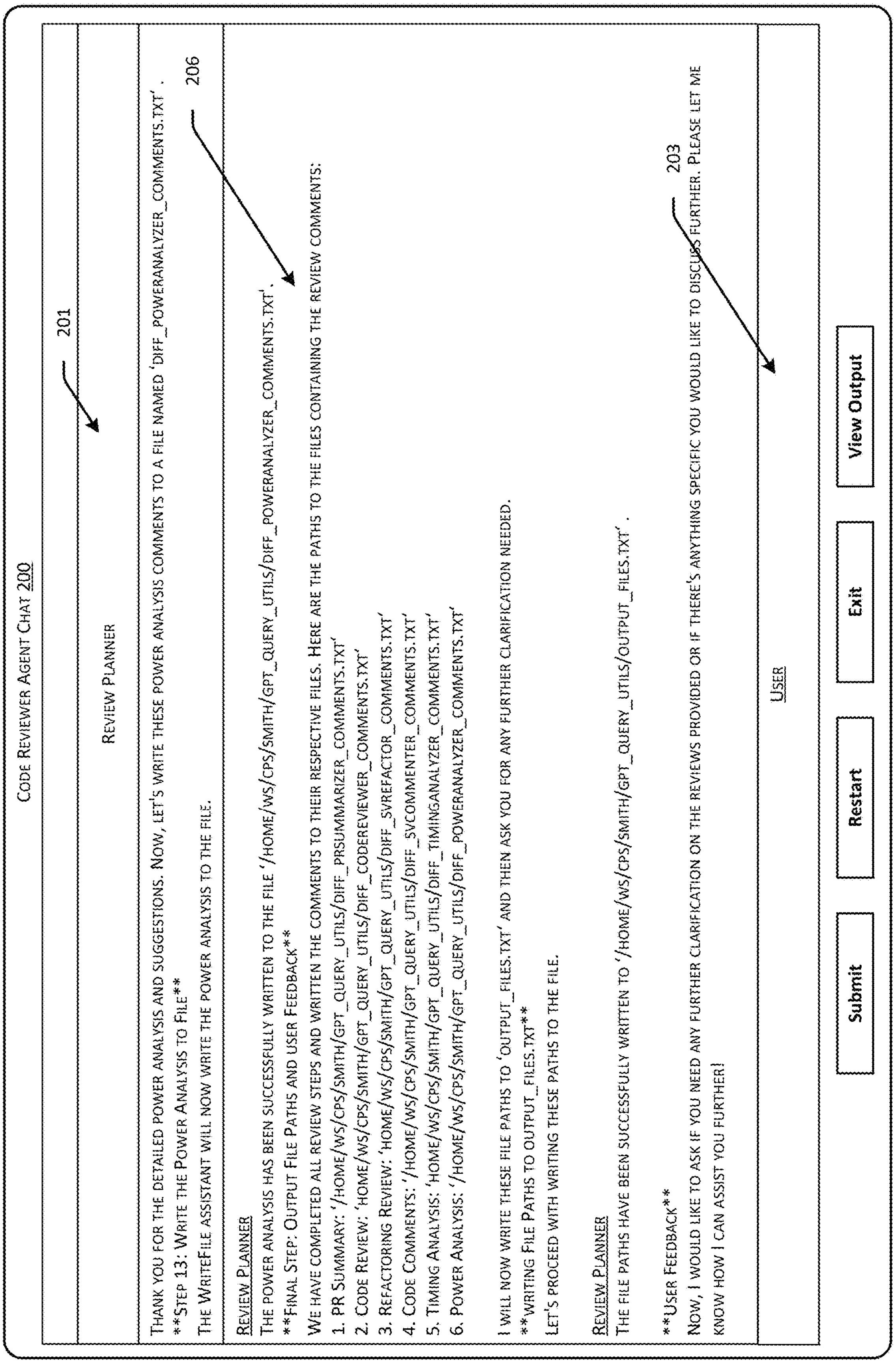
Figure 2D:
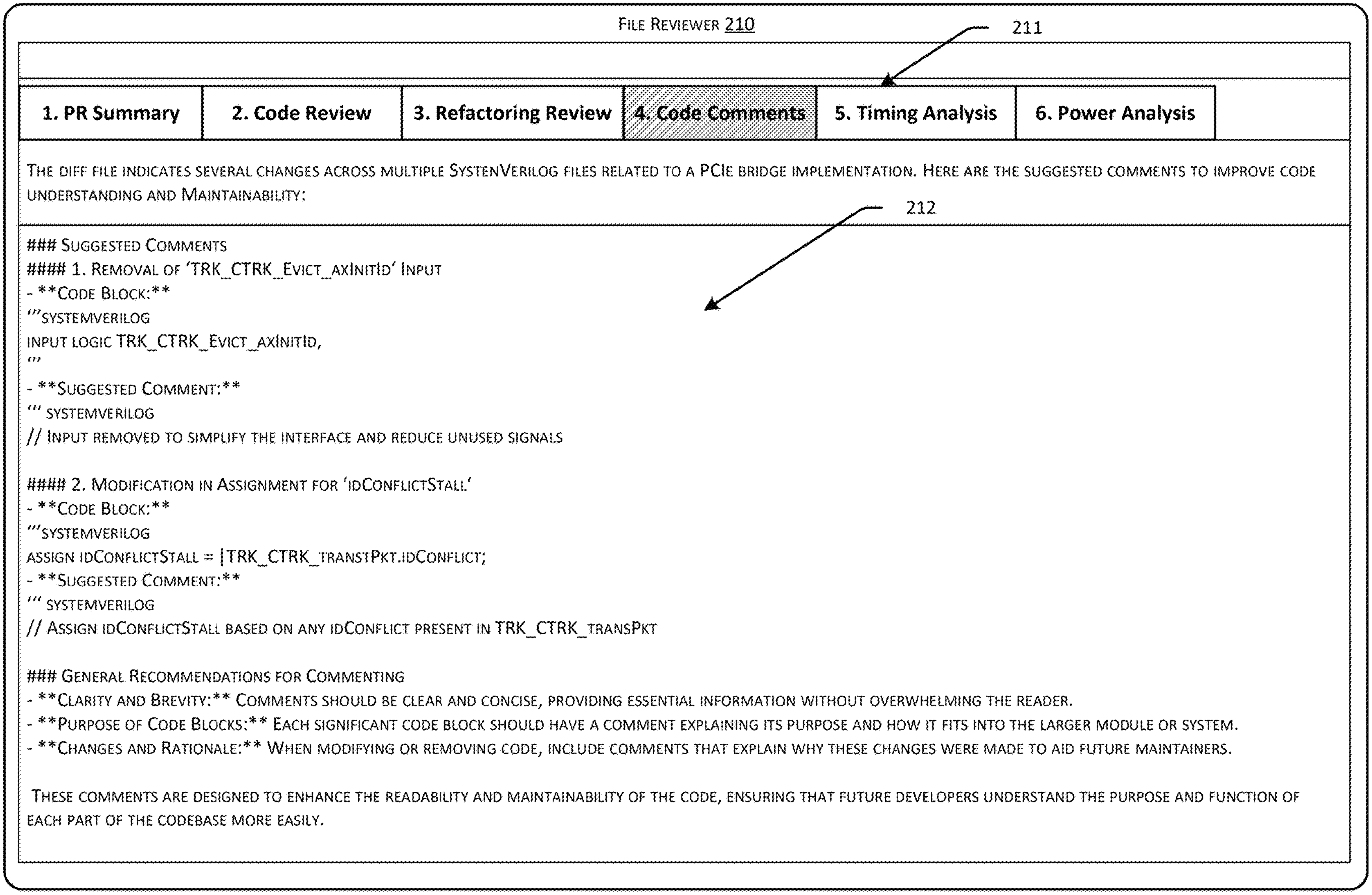

FIGS. 2A through 2D illustrate example interfaces provided by a review planner agent. FIG. 2A illustrates code reviewer agent chat window 200 with the review planner agent pane 201. When a file path for a diff file is provided, the review planner provides a plan 202 as shown in FIG. 2B. The reviewer agent chat window 200 includes a user pane 203 for receiving user inputs. FIG. 2C illustrates further responses in the review planner pane 201 showing locations of the review comments 206 as well as further instructions to the user. FIG. 2D illustrates a file reviewer window 210 with selectable tabs for the various agent outputs 211 and content 212 for the selected tab.

Figure 3:
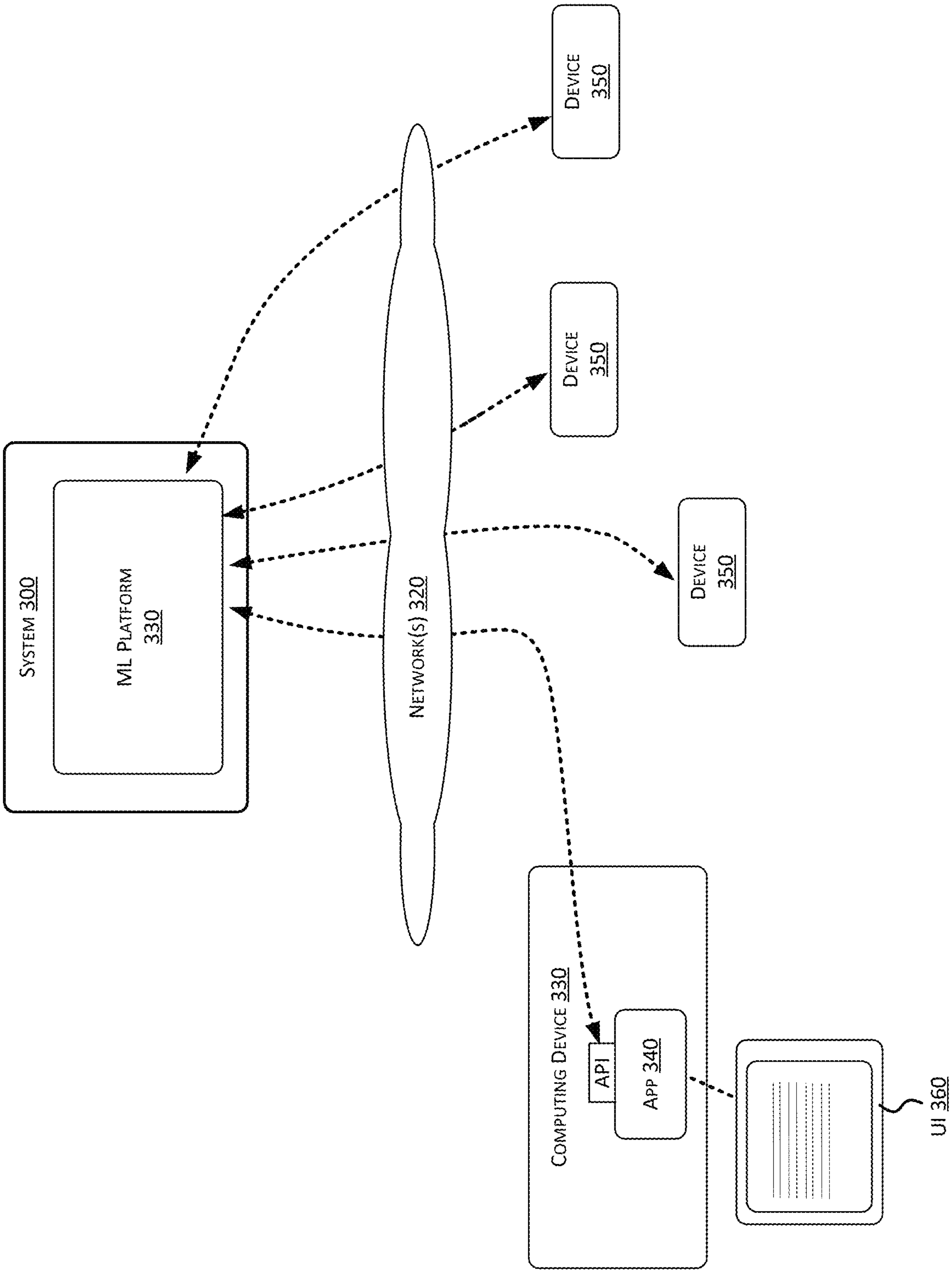
FIG. 3 is a diagram showing aspects of an example system according to one embodiment disclosed herein.

In various embodiments, machine learning model(s) may be run locally on the client. In other embodiments, machine learning inferencing can be performed on a server of a network. For example, in the system illustrated in FIG. 3, a system 300 is illustrated that implements ML platform 330. The ML platform 330 may be configured to provide output data to various devices 350 over a network 320, as well as computing device 350. A user interface 360 may be rendered on computing device 350. The user interface 360 may be provided in conjunction with an application 340 that communicates to the ML platform 330 using an API via network 320. In some embodiments, system 300 may be configured to provide issue identification information to users. In one example, ML platform 330 may implement a machine learning system to perform one or more tasks. The ML platform 330 utilizes the machine learning system to perform tasks such as root cause identification. The machine learning system may be configured to be optimized using the techniques described herein.

Figure 4:
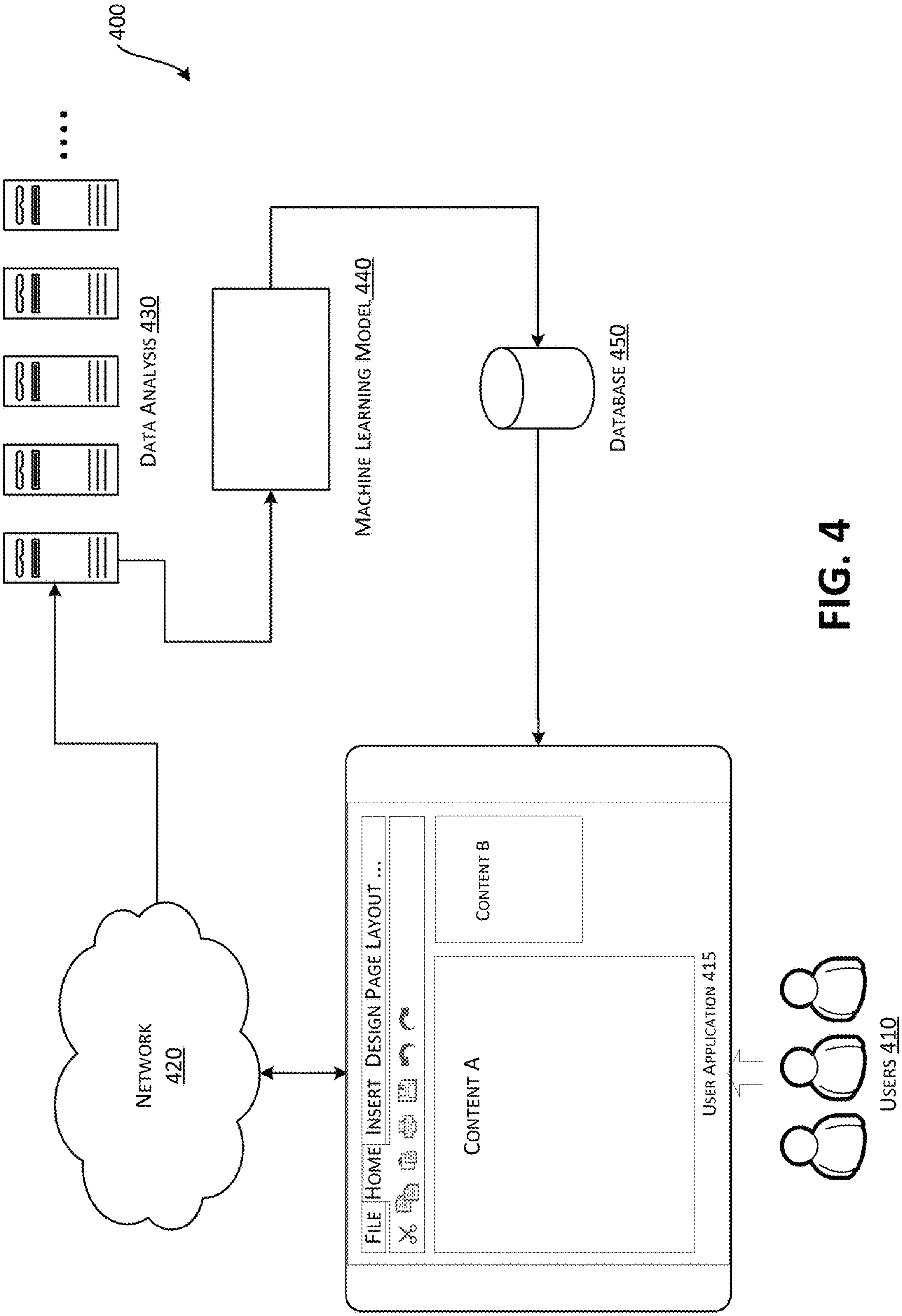
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g., memory and mass storage devices), and networking components (e.g., routers, switches, and cables). The data analysis components 430 can also include software, such as operating systems, applications, and containers, network services, virtual components, such as virtual disks, virtual networks, and virtual machines. Database 450 can include data, such as a database, or a database shard (i.e., a partition of a database). Feedback may be used to further update various parameters that are used by machine learning model 420. Data may be provided to the user application 415 to provide results to various users 410 using a user application 415. In some configurations, machine learning model 440 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
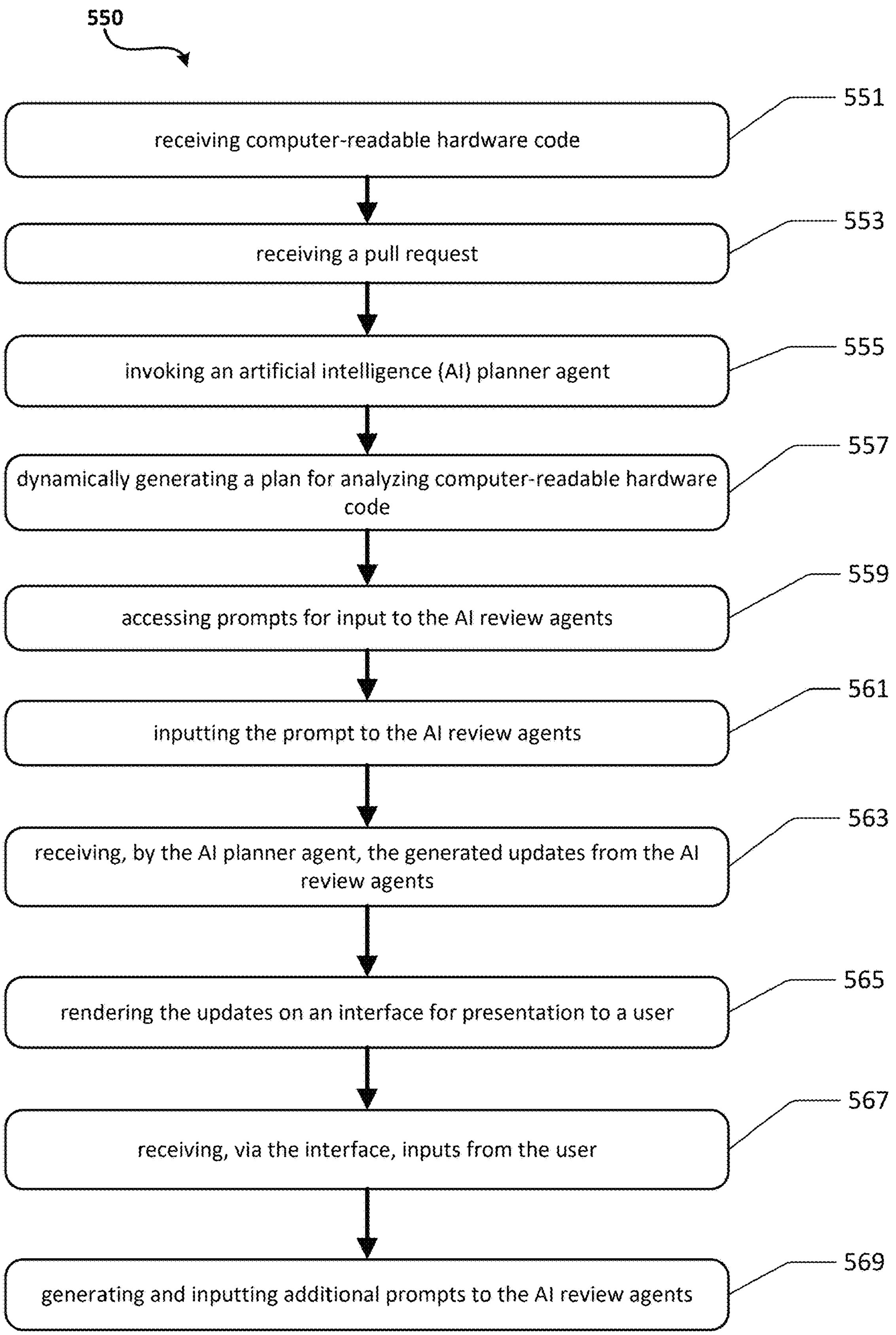
FIG. 5 is a flow diagram showing aspects of an illustrative procedure, according to embodiments disclosed herein.

Turning now to FIG. 5, illustrated is an example operational procedure 550 for analyzing computer-readable hardware code in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 551 illustrates receiving computer-readable hardware code, that, when compiled, generates computer executable instructions that when executed by a computing system, perform operations to be performed by the computing system. In an embodiment, the computer-readable code is represented as a structured computer-readable object conforming to a programming language.

Operation 553 illustrates receiving a pull request indicating a purpose of the hardware code or updates made to the hardware code.

Operation 555 illustrates invoking an artificial intelligence (AI) planner agent configured to interact with a plurality of AI review agents that are each trained to: parse the hardware code; analyze the hardware code with respect to the pull request and an attribute; and generate updates to the hardware code in accordance with criteria for meeting the attribute.

Operation 557 illustrates dynamically generating a plan for analyzing the hardware code.

Operation 559 illustrates based on the plan, accessing prompts for input to the AI review agents, In an embodiment, the prompts are usable to cause the AI review agents to analyze content of the hardware code and generate the updates to the hardware code in accordance with the criteria for meeting the attribute.

Operation 561 illustrates inputting the prompts to the AI review agents.

Operation 563 illustrates receiving, by the AI planner agent, the generated updates from the AI review agents.

Operation 565 illustrates rendering the updates on an interface for presentation to a user.

Operation 567 illustrates receiving, via the interface, inputs from the user.

Operation 569 illustrates based on the inputs from the user, generating and inputting, by the AI planner agent, additional prompts to the AI review agents.

Figure 6:
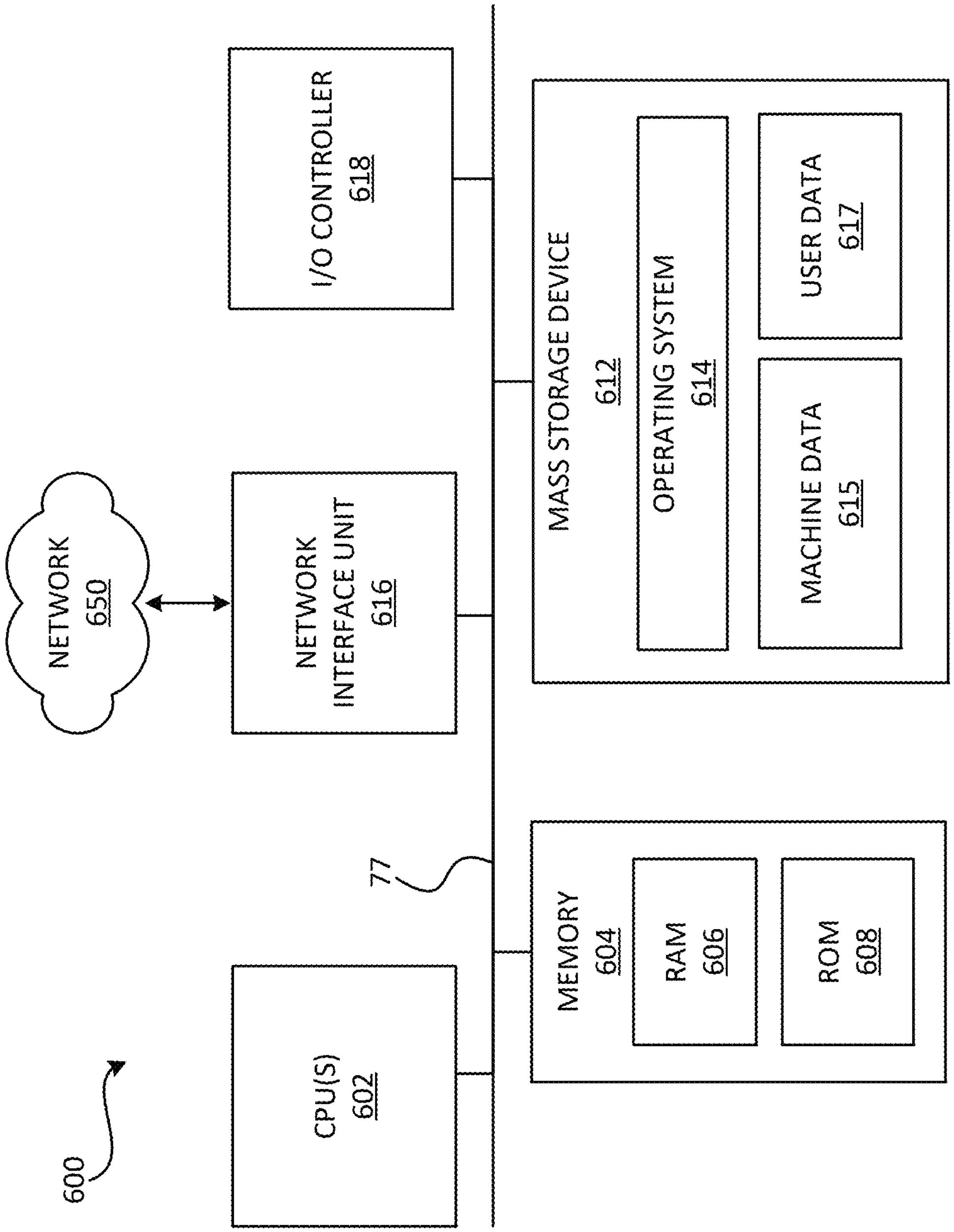
FIG. 6 is a computer architecture diagram illustrating aspects of an example computer architecture for a computer capable of executing the components described herein.

FIG. 6 shows an example computer architecture for a computer capable of providing the functionality described herein such as, for example, a computing device configured to implement the functionality described above with reference to FIGS. 1-5. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 77 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, such as machine data 615 or user data 617.

The mass storage device 612 is connected to the CPU 602 through a mass storage controller (not shown) connected to the bus 77. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 77. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 7:
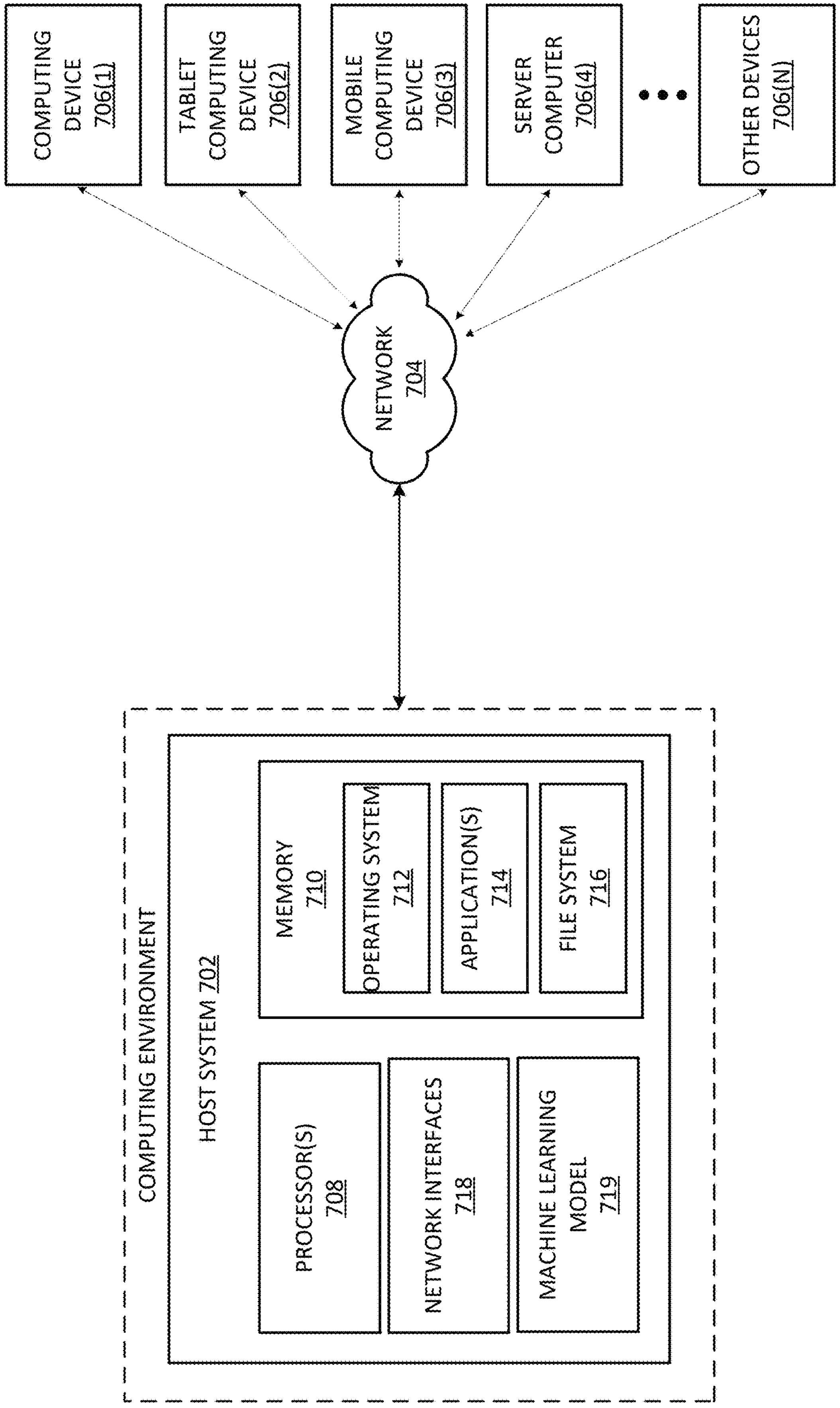
FIG. 7 is a data architecture diagram showing an illustrative example of a computer environment.

FIG. 7 illustrates an example computing environment capable of executing the techniques and processes described above with respect to FIGS. 1-6. In various examples, the computing environment comprises a host system 702. In various examples, the host system 702 operates on, in communication with, or as part of a network 704.

The network 704 can be or can include various access networks. For example, one or more client devices 706(1) . . . 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 708 memory 710. The memory 710 can comprise an operating system 712, application(s) 714, and/or a file system 716. Moreover, the memory 710 can comprise the memory 604 described above with respect to FIG. 6.

The processor(s) 708 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 718. The network interfaces 718 can include various types of network hardware and software for supporting communications between two or more devices. The host system 702 may also include machine learning model 719.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Clause 1: A method of analyzing computer-readable hardware code, the method comprising:

- receiving computer-readable hardware code, that, when compiled, generates computer executable instructions that when executed by a computing system, perform operations to be performed by the computing system, the computer-readable hardware code conforming to a programming language;
- receiving a pull request indicating a purpose of the hardware code or updates made to the hardware code;

invoking an artificial intelligence (AI) planner agent configured to interact with a plurality of AI review agents that are each trained to:

parse the hardware code;

analyze the hardware code with respect to the pull request and an attribute; and generate updates to the hardware code in accordance with criteria for meeting the attribute;

dynamically generating a plan for analyzing the hardware code;

based on the plan, accessing prompts for input to the AI review agents, wherein the prompts are usable to cause the AI review agents to analyze content of the hardware code and generate the updates to the hardware code in accordance with the criteria for meeting the attribute;

inputting the prompts to the AI review agents;

receiving, by the AI planner agent, the generated updates from the AI review agents;

rendering the updates on an interface for presentation to a user;

receiving, via the interface, inputs from the user; and based on the inputs from the user, generating and inputting, by the AI planner agent, additional prompts to the AI review agents.

Clause 2: The method of clause 1, further comprising using the updates to generate recommendations for improving the hardware code.

Clause 3: The method of any of clauses 1-2, wherein the AI review agents comprise a code refactor agent, power optimization agent, timing optimization agent, comment agent, or PR summarizer agent.

Clause 4: The method of any of clauses 1-3, wherein the AI review agents comprise a CDC/RDC agent configured to ensure that there are no clock domain crossing and reset domain crossing violations introduced due to the updates made to the hardware code.

Clause 5: The method of any of clauses 1-4, wherein the AI review agents comprise a test bench agent configured to analyze if there are any additional test cases or coverage conditions that can be added to the hardware code.

Clause 6: The method of any of clauses 1-5, further comprising providing a collaborative review mode wherein the AI planner agent exchanges additional code review feedback from assigned reviewers, and incorporates the additional code review feedback to generate the recommendations.

Clause 7: The method of clauses 1-6, wherein the AI review agents comprise a security vulnerability detection agent configured to scan for vulnerabilities of the hardware code.

Clause 8: A computing system, comprising:

one or more processors; and a computer-readable storage medium having computer-executable instructions stored thereupon which, when executed by the processor, cause the computing system to perform operations comprising:

receiving computer-readable hardware code, that, when compiled, generates computer executable instructions that when executed by a computer, perform operations to be performed by the computer, the computer-readable hardware code conforming to a programming language;

receiving a pull request indicating a purpose of the hardware code or updates made to the hardware code;

invoking an artificial intelligence (AI) planner agent configured to interact with a plurality of AI review agents that are each trained to:

parse the hardware code;

analyze the hardware code with respect to the pull request and an attribute; and generate updates to the hardware code in accordance with criteria for meeting the attribute;

dynamically generating a plan for analyzing the hardware code;

based on the plan, accessing prompts for input to the AI review agents, wherein the prompts are usable to cause the AI review agents to analyze content of the hardware code and generate the updates to the hardware code in accordance with the criteria for meeting the attribute;

inputting the prompts to the AI review agents;

receiving, by the AI planner agent, the generated updates from the AI review agents; and using the updates to generate recommendations for improving the hardware code.

Clause 9: The computing system of clause 8, further comprising computer-executable instructions which, when executed by the processor, cause the computing system to perform operations comprising:

rendering the updates on an interface for presentation to a user;

receiving, via the interface, inputs from the user; and based on the inputs from the user, generating and inputting, by the AI planner agent, additional prompts to the AI review agents.

Clause 10: The computing system of any of clauses 8 and 9, wherein the AI review agents comprise a code refactor agent, power optimization agent, timing optimization agent, comment agent, or PR summarizer agent.

Clause 11: The computing system of any of clauses 8-10, wherein the AI review agents comprise a CDC/RDC agent configured to ensure that there are no clock domain crossing and reset domain crossing violations introduced due to the updates made to the hardware code.

Clause 12: The computing system of any of clauses 8-11, wherein the AI review agents comprise a test bench agent configured to analyze if there are any additional test cases or coverage conditions that can be added to the hardware code.

Clause 13: The computing system of any of clauses 8-12, wherein the AI review agents comprise a security vulnerability detection agent configured to scan for vulnerabilities of the hardware code.

Clause 14: The computing system of any of clauses 8-13, further comprising computer-executable instructions which, when executed by the processor, cause the computing system to perform operations comprising running a collaborative review mode wherein the AI planner agent exchanges additional code review feedback from assigned reviewers, and incorporates the additional code review feedback to generate the recommendations.

Clause 15: A computer-readable storage medium having computer-executable instructions stored thereupon which, when executed by a processor of a computing system, cause the computing system to perform operations comprising:

receiving computer-readable hardware code, that, when compiled, generates computer executable instructions that when executed by a computer, perform operations to be performed by the computer, the computer-readable hardware code conforming to a programming language;

receiving a pull request indicating a purpose of the hardware code or updates made to the hardware code;

invoking an artificial intelligence (AI) planner agent configured to interact with a plurality of AI review agents that are each trained to:

parse the hardware code;

analyze the hardware code with respect to the pull request and an attribute; and generate updates to the hardware code in accordance with criteria for meeting the attribute;

dynamically generating a plan for analyzing the hardware code;

based on the plan, accessing prompts for input to the AI review agents, wherein the prompts are usable to cause the AI review agents to analyze content of the hardware code and generate the updates to the hardware code in accordance with the criteria for meeting the attribute;

inputting the prompts to the AI review agents;

receiving, by the AI planner agent, the generated updates from the AI review agents;

rendering the updates on an interface for presentation to a user;

receiving, via the interface, inputs from the user; and based on the inputs from the user, generating and inputting, by the AI planner agent, additional prompts to the AI review agents.

Clause 16: The computer-readable storage medium of clause 15, further comprising computer-executable instructions stored thereupon which, when executed by the processor of the computing system, cause the computing system to perform operations comprising using the updates to generate recommendations for improving the hardware code.

Clause 17: The computer-readable storage medium of any of clauses 15 and 16, wherein the AI review agents comprise a code refactor agent, power optimization agent, timing optimization agent, comment agent, or PR summarizer agent.

Clause 18: The computer-readable storage medium of any of clauses 15-17, wherein the AI review agents comprise a CDC/RDC agent configured to ensure that there are no clock domain crossing and reset domain crossing violations introduced due to the updates made to the hardware code.

Clause 19: The computer-readable storage medium of any of clauses 15-18, wherein the AI review agents comprise a test bench agent configured to analyze if there are any additional test cases or coverage conditions that can be added to the hardware code.

Clause 20: The computer-readable storage medium of any of clauses 15-18, wherein the AI review agents comprise a security vulnerability detection agent configured to scan for vulnerabilities of the hardware code.

What is claimed is:

1. A method of analyzing computer-readable hardware code, the method comprising:

receiving computer-readable hardware code, that, when compiled, generates computer executable instructions that when executed by a computing system, perform operations to be performed by the computing system, the computer-readable hardware code conforming to a programming language;

receiving a pull request indicating a purpose of changes to the hardware code or updates made to the hardware code;

invoking an artificial intelligence (AI) planner agent configured to interact with a plurality of AI review agents that are each trained to:

parse the hardware code;

analyze the hardware code with respect to the pull request and an attribute; and generate updates to the hardware code in accordance with criteria for meeting the attribute;

dynamically generating a plan for analyzing the hardware code;

based on the plan, accessing prompts for input to the AI review agents, wherein the prompts are usable to cause the AI review agents to analyze content of the hardware code and generate the updates to the hardware code in accordance with the criteria for meeting the attribute;

inputting the prompts to the AI review agents;

receiving, by the AI planner agent, the AI-generated updates from the AI review agents;

rendering the AI-generated updates on an interface for presentation to a user;

receiving, via the interface, inputs from the user; and based on the inputs from the user, generating and inputting, by the AI planner agent, additional prompts to the AI review agents.

2. The method of claim 1, further comprising using the AI-generated updates to generate recommendations for improving the hardware code.

3. The method of claim 1, wherein the AI review agents comprise a code refactor agent, power optimization agent, timing optimization agent, comment agent, or PR summarizer agent.

4. The method of claim 1, wherein the AI review agents comprise a CDC/RDC agent configured to ensure that there are no clock domain crossing and reset domain crossing violations introduced due to the updates made to the hardware code identified by the pull request.

5. The method of claim 1, wherein the AI review agents comprise a test bench agent configured to analyze if there are test cases or coverage conditions that can be added to the hardware code.

6. The method of claim 2, further comprising providing a collaborative review mode wherein the AI planner agent exchanges code review feedback with assigned reviewers, and incorporates the code review feedback to generate the recommendations.

7. The method of claim 1, wherein the AI review agents comprise a security vulnerability detection agent configured to scan for vulnerabilities of the hardware code.

8. A computing system, comprising:

a processor; and a computer-readable storage medium having computer-executable instructions stored thereupon which, when executed by the processor, cause the computing system to perform operations comprising:

receiving computer-readable hardware code, that, when compiled, generates computer executable instructions that when executed by a computer, perform operations to be performed by the computer, the computer-readable hardware code conforming to a programming language;

receiving a pull request indicating a purpose of changes to the hardware code or updates made to the hardware code;

invoking an artificial intelligence (AI) planner agent configured to interact with a plurality of AI review agents that are each trained to:

parse the hardware code;

analyze the hardware code with respect to the pull request and an attribute; and generate updates to the hardware code in accordance with criteria for meeting the attribute;

dynamically generating a plan for analyzing the hardware code;

based on the plan, accessing prompts for input to the AI review agents, wherein the prompts are usable to cause the AI review agents to analyze content of the hardware code and generate updates to the hardware code in accordance with the criteria for meeting the attribute;

inputting the prompts to the AI review agents;

receiving, by the AI planner agent, the AI-generated updates from the AI review agents; and using the AI-generated updates to generate recommendations for improving the hardware code.

9. The computing system of claim 8, further comprising computer-executable instructions which, when executed by the processor, cause the computing system to perform operations comprising:

rendering the AI-generated updates on an interface for presentation to a user;

receiving, via the interface, inputs from the user; and based on the inputs from the user, generating and inputting, by the AI planner agent, additional prompts to the AI review agents.

10. The computing system of claim 8, wherein the AI review agents comprise a code refactor agent, power optimization agent, timing optimization agent, comment agent, or PR summarizer agent.

11. The computing system of claim 8, wherein the AI review agents comprise a CDC/RDC agent configured to ensure that there are no clock domain crossing and reset domain crossing violations introduced due to the updates made to the hardware code identified by the pull request.

12. The computing system of claim 8, wherein the AI review agents comprise a test bench agent configured to analyze if there are test cases or coverage conditions that can be added to the hardware code.

13. The computing system of claim 8, wherein the AI review agents comprise a security vulnerability detection agent configured to scan for vulnerabilities of the hardware code.

14. The computing system of claim 9, further comprising computer-executable instructions which, when executed by the processor, cause the computing system to perform operations comprising running a collaborative review mode wherein the AI planner agent exchanges code review feedback with assigned reviewers, and incorporates the code review feedback to generate the recommendations.

15. A computer-readable storage medium having computer-executable instructions stored thereupon which, when executed by a processor of a computing system, cause the computing system to perform operations comprising:

receiving computer-readable hardware code, that, when compiled, generates computer executable instructions that when executed by a computer, perform operations to be performed by the computer, the computer-readable hardware code conforming to a programming language;

receiving a pull request indicating a purpose of changes to the hardware code or updates made to the hardware code;

invoking an artificial intelligence (AI) planner agent configured to interact with a plurality of AI review agents that are each trained to:

parse the hardware code;

analyze the hardware code with respect to the pull request and an attribute; and generate updates to the hardware code in accordance with criteria for meeting the attribute;

dynamically generating a plan for analyzing the hardware code;

based on the plan, accessing prompts for input to the AI review agents, wherein the prompts are usable to cause the AI review agents to analyze content of the hardware code and generate updates to the hardware code in accordance with the criteria for meeting the attribute;

inputting the prompts to the AI review agents;

receiving, by the AI planner agent, the AI-generated updates from the AI review agents;

rendering the AI-generated updates on an interface for presentation to a user;

receiving, via the interface, inputs from the user; and based on the inputs from the user, generating and inputting, by the AI planner agent, additional prompts to the AI review agents.

16. The computer-readable storage medium of claim 15, further comprising computer-executable instructions stored thereupon which, when executed by the processor of the computing system, cause the computing system to perform operations comprising using the AI-generated updates to generate recommendations for improving the hardware code.

17. The computer-readable storage medium of claim 15, wherein the AI review agents comprise a code refactor agent, power optimization agent, timing optimization agent, comment agent, or PR summarizer agent.

18. The computer-readable storage medium of claim 15, wherein the AI review agents comprise a CDC/RDC agent configured to ensure that there are no clock domain crossing and reset domain crossing violations introduced due to the updates made to the hardware code identified by the pull request.

19. The computer-readable storage medium of claim 15, wherein the AI review agents comprise a test bench agent configured to analyze if there are test cases or coverage conditions that can be added to the hardware code.

20. The computer-readable storage medium of claim 15, wherein the AI review agents comprise a security vulnerability detection agent configured to scan for vulnerabilities of the hardware code.

* * * * *